United States Patent Office 2,723,992
Patented Nov. 15, 1955

2,723,992

PREPARATION OF GALLIC ACID FROM TANNIN-CONTAINING MATERIALS

Paul A. Krueger, Lawrence A. Patterson, and Robert J. Turner, Ferguson, and Robert D. Rands, Jr., Greendale, Mo., assignors to Mallinckrodt Chemical Works, St. Louis, Mo., a corporation of Missouri No Drawing. Application April 19, 1952, Serial No. 283,254

20 Claims. (Cl. 260—521)

This invention relates to the treatment of tannin-containing materials and more particularly to the preparation of gallic acid from tannin-containing materials.

Briefly, the present invention is directed to methods of preparing gallic acid which comprises hydrolyzing a tannin-containing material, extracting the hydrolyzed tannin-containing material with a water-immiscible solvent for gallic acid, and recovering gallic acid from the resulting extract.

Among the several objects of this invention are the provision of improved methods for the preparation of gallic acid from tannin-containing materials; the provision of methods of the class described which are economical and efficient in operation; and the provision of methods for the preparation of pure gallic acid of light color. Other objects will be in part apparent and in part pointed out hereinafter.

The invention accordingly comprises the methods hereinafter described, the scope of the invention being indicated in the following claims.

It has been customary to prepare gallic acid by hydrolysis of tannin. The tannin is generally produced from certain tannin-containing materials such as Chinese nut galls, by extraction with water or some other solvent, followed by evaporation to obtain the tannin in solid form or in the form of a concentrated solution. However, the process is slow, large amounts of solvent must be evaporated and the soluble gums and resins also present in the tannin-containing material interfere with extraction of the concentrated liquors and purification of the gallic acid. Moreover, the gallic acid so obtained still contains impurities which must be removed by further processing before the product is suitable for many purposes.

According to one embodiment of this invention, tannin-containing materials are hydrolyzed with a hydrolyzing agent such as an acid or alkali and the gallic acid thus formed is extracted from the hydrolysis liquors with a water-immiscible solvent for gallic acid. After separation from the aqueous phase the solvent extract is steam distilled to remove the solvent. The resulting aqueous solution can then be treated with iron-free activated carbon and filtered if desired, after which crystals of gallic acid are obtained on cooling the concentrated aqueous liquor. By this process almost all of the non-gallic acid material and the residual coloring matter remain in the hydrolysis liquor and the resulting gallic acid is of light color and good quality.

Although tannin-containing vegetable substances are preferably hydrolyzed in accordance with the present invention without prior isolation of the tannin, tannin or tannin-containing liquors obtained by any suitable procedure may also be utilized as a starting material for the acid or alkali hydrolysis disclosed herein. Acid hydrolysis, such as by heating the tannin-containing material with sulfuric acid for thirty to forty hours, normally yields only seventy-five to eighty per cent as much gallic acid as is obtained by a one-hour hydrolysis with sodium hydroxide. Alkaline hydrolysis is also advantageous for the reason that less color is formed in the reaction mixture, and therefore a lighter colored product is obtained.

The gallic acid can be isolated by crystallizing it directly from the hydrolysis mixture but a purer and more desirable product is obtained by extracting it from the liquor with a water-immiscible solvent.

Illustrative of suitable water-immiscible solvents for gallic acid are methyl isobutyl ketone, methyl isobutyl carbinol, mixtures of isomeric amyl alcohols, isoamyl alcohol, and cyclohexanone.

As a further embodiment of this invention, the amount of water required for the hydrolysis of the tannin-containing materials can be reduced by replacing part of it with a portion of the water-immiscible solvent, in which case less solvent is required in the subsequent extraction step.

Examples of tannin-containing materials are tea leaves, tara pods, Chinese nut galls, divi divi pods, sumac leaves and Aleppo galls.

It has also been found that the presence of certain reducing agents during the hydrolysis of the tannin-containing material considerably decreases the amount of color formed during that operation, thereby simplifying the purification of the product. A reducing agent such as sodium hydrosulfite, for example, has been found to be particularly effective during alkaline hydrolysis while other reducing agents such as sulfur dioxide and sodium bisulfite have been found to be particularly useful during acid hydrolysis.

Although it is convenient to separate the solvent from the gallic acid by steam distillation, other methods are applicable. For example, the solvent can be evaporated or distilled off or the gallic acid can be extracted from the solvent with water or an aqueous alkali solution.

The following examples illustrate the invention.

Example I

To ground tara (150 g.) and water (60 ml.) was added 50 per cent sodium hydroxide solution (120 g.) and methyl isobutyl ketone (60 ml.). The mixture was stirred at reflux temperature for one and one-half hours and then cooled. Sufficient 60° Bé. sulfuric acid was added to neutralize the alkali and liberate the gallic acid from its salts.

The gallic acid was extracted from the hydrolysis liquor with three successive 1500 ml. portions of methyl isobutyl ketone. After separating the ketone extract from the reaction mixture by decantation, it was steam distilled and the hot residual extract was then treated with iron-free activated carbon and allowed to cool. The crude gallic acid which crystallized from the solution was filtered off and dried. Yield 54 g.

Example II

The method of Example I was repeated using 60 ml. of methyl isobutyl carbinol in the hydrolysis and three 1,000 ml. portions of methyl isobutyl carbinol in the extraction in place of methyl isobutyl ketone. Gallic acid of good purity was obtained in subtsantial yield.

Example III

The method of Example I was repeated using 60 ml. of isoamyl alcohol in the hydrolysis and three 1,000 ml. portions of isoamyl alcohol in the extraction in place of methyl isobutyl ketone. Gallic acid of good purity was obtained in substantial yield.

Example IV

The method of Example I was repeated using cyclohexanone (60 ml.) in the hydrolysis and three 1,000 ml. portions of cyclohexanone in the extraction in place of methyl isobutyl ketone. Gallic acid of good purity was obtained in substantial yield.

*Example V*

The method of Example I was repeated using a mixture of isomeric amyl alcohols (60 ml.) (such as the material sold under the trade designation "Pentasol") in the hydrolysis and three 1,000 ml. portions of the alcohol mixture in the extraction in place of methyl isobutyl ketone. Gallic acid of good purity was obtained in substantial yield.

*Example VI*

To ground tara (150 g.) and water (150 ml.) was added 50 per cent sodium hydroxide solution (120 g.). The mixture was stirred at the reflux temperature for one and one-half hours and was then cooled. Sufficient 60° Bé. sulfuric acid was added to neutralize the alkali and liberate the gallic acid from its salts.

The gallic acid was extracted from the hydrolysis liquor with three successive 1500 ml. portions of methyl isobutyl ketone which were separated from the reaction mixture by decantation. The ketone extract was steam distilled and the hot residual extract was treated with iron-free activated carbon and allowed to cool. The crude gallic acid which crystallized from the aqueous liquor was filtered off and dried.

*Example VII*

To ground tara (150 g.) was added concentrated sulfuric acid (15 ml.) in water (375 ml.) and the mixture was heated at 96–98° C. for twenty-four hours. The reaction mixture was filtered while hot and washed with hot water (175 ml.).

The filtrate and wash water were combined and the gallic acid was extracted with three successive 1500 ml. portions of methyl isobutyl ketone which were separated from the reaction mixture by decantation. The ketone extract was steam distilled and the hot residual extract was then treated with iron-free activated carbon and allowed to cool. The crude gallic acid which crystallized from the aqueous liquor was filtered off and dried.

*Example VIII*

To ground Chinese nut galls (120 g.) and water (60 ml.) was added 50 per cent sodium hydroxide solution (120 g.) and methyl isobutyl ketone (60 ml.). The mixture was stirred at the reflux temperature for one and one-half hours and then cooled. Sufficient 60° Bé. sulfuric acid was added to neutralize the alkali and liberate the gallic acid from its salts. Gallic acid was extracted with three successive 1500 ml. portions of methyl isobutyl ketone which were separated from the reaction mixture by decantation. The ketone extract was steam distilled and the hot residual extract was then treated with iron-free activated carbon and allowed to cool. Crude gallic acid which crystallized from the aqueous solution was filtered off and dried. Yield 59 g.

*Example IX*

To ground sumac leaves (150 g.) and water (60 ml.) was added 50 per cent sodium hydroxide solution (120 g.) and methyl isobutyl ketone (60 ml.). The mixture was stirred at reflux temperature for one and one-half hours and cooled. Crude 60° Bé. sulfuric acid was added to neutralize the alkali and liberate the gallic acid from its salts.

The gallic acid was extracted with three successive 1500 ml. portions of methyl isobutyl ketone which were separated from the reaction mixture by decantation. The ketone extract was steam distilled and the hot residual extract was then treated with iron-free activated carbon and allowed to cool. Crude gallic acid crystallized from the aqueous liquor and was filtered off and dried. Yield 33 g.

*Example X*

The method of Example I was repeated incorporating sodium hydrosulfite (5 g.) with the reactants for hydrolysis. The resulting gallic acid was substantially lighter in color than the product obtained by the method described in Example I.

*Example XI*

To ground tara (120 g.) was added water (300 ml.) and concentrated sulfuric acid (20 ml.). The temperature of the mixture was maintained at 98–100° C. for twenty-four hours and then filtered hot. The residue was washed with hot water (150 ml.) and the washings were added to the original filtrate. Gallic acid crystallized from the cooled filtrate. Yield 27.5 g.

It is to be understood that alkalis other than sodium hydroxide (such as potassium and calcium hydroxides), and acids other than sulfuric (such as hydrochloric, phosphoric and toluenesulfonic acids) may be utilized in the alkali or acid hydrolysis herein.

In view of the above, it will be seen that the several objects of the invention are achieved and other advantageous results attained.

As many changes could be made in the above methods without departing from the scope of the invention, it is intended that all matter contained in the above description shall be interpreted as illustrative and not in a limiting sense.

We claim:

1. A method of preparing gallic acid comprising chemically hydrolyzing a tannin-containing material in an aqueous medium, extracting the hydrolyzed tannin-containing material with a water-immiscible solvent for gallic acid, said water-immiscible solvent having a boiling point not substantially less than 100° C., and recovering gallic acid from the resulting extract.

2. A method of preparing gallic acid comprising chemically hydrolyzing a tannin-containing material in the presence of water and a water-immiscible solvent for gallic acid, said water-immiscible solvent having a boiling point not substantially less than 100° C., extracting the hydrolyzed tannin-containing material with more of said solvent, and recovering gallic acid from the resulting extract.

3. A method of preparing gallic acid comprising chemically hydrolyzing a tannin-containing material in the presence of water and a reducing agent, extracting the hydrolyzed tannin-containing material with a water-immiscible solvent for gallic acid, said water-immiscible solvent having a boiling point not substantially less than 100° C., and recovering gallic acid from the resulting extract.

4. A method of preparing gallic acid comprising chemically hydrolyzing a tannin-containing material in the presence of a hydrolyzation agent, water and a water-immiscible solvent for gallic acid, said water-immiscible solvent having a boiling point not substantially less than 100° C., extracting the hydrolyzed tannin-containing material with more of said solvent, removing said solvent from the resulting extract by steam distillation, and recovering gallic acid from the residual extract.

5. A method of preparing gallic acid comprising chemically hydrolyzing a tannin-containing material selected from the group consisting of tara pods, Chinese nut galls, and sumac leaves in the presence of water and a water-immiscible solvent for gallic acid selected from the group consisting of methyl isobutyl ketone, methyl isobutyl carbinol, amyl alcohols and cyclohexanone, extracting the hydrolyzed tannin-containing material with more of said solvent, removing said solvent from the resulting extract by steam distillation, and crystallizing gallic acid from the residual extract.

6. In the preparation of gallic acid by chemical hydrolyzation of an aqueous suspension of a tannin-containing material, the steps of extracting the resulting hydrolysis liquor with a water-immiscible solvent for gallic acid, said water-immiscible solvent having a boiling point not substantially less than 100° C., and recovering gallic acid from the resulting extract.

7. In the preparation of gallic acid by chemical hydrolyzation of an aqueous suspension of tannin-containing materials, the steps of extracting the resulting hydrolysis liquor with a water-immiscible solvent for gallic acid, said water-immiscible solvent having a boiling point not substantially less than 100° C., removing said solvent from the resulting extract by steam distillation, and crystallizing gallic acid from the residual extract.

8. A method of preparing gallic acid comprising hydrolyzing an aqueous suspension of ground tara pods in the presence of an alkali and a water-immiscible solvent for gallic acid, said water-immiscible solvent having a boiling point not substantially less than 100° C., extracting the resulting hydrolysis liquor with more of said solvent, removing said solvent from the resulting extract by steam distillation, and crystallizing gallic acid from the residual extract.

9. A method of preparing gallic acid comprising hydrolyzing an aqueous suspension of ground tara pods in the presence of an alkali, a water-immiscible solvent for gallic acid and a reducing agent, said water-immiscible solvent having a boiling point not substantially less than 100° C., extracting the resulting hydrolysis liquor with more of said solvent, removing said solvent from the resulting extract by steam distillation, and crystallizing gallic acid from the residual extract.

10. A method of preparing gallic acid comprising hydrolyzing an aqueous suspension of ground tara pods in the presence of sodium hydroxide, a water-immiscible solvent for gallic acid and sodium hydrosulfite, said water-immiscible solvent having a boiling point not substantially less than 100° C., extracting the resulting hydrolysis liquor with more of said solvent, removing said solvent from the resulting extract by steam distillation, and crystallizing gallic acid from the residual extract.

11. A method of preparing gallic acid comprising hydrolyzing an aqueous suspension of ground tara pods in the presence of sulfuric acid, extracting the resulting hydrolysis liquor with a water-immiscible solvent for gallic acid, said water-immiscible solvent having a boiling point not substantially less than 100° C., removing said solvent from the resulting extract by steam distillation, and crystallizing gallic acid from the residual extract.

12. A method of preparing gallic acid comprising hydrolyzing an aqueous suspension of ground Chinese nut galls in the presence of a water-immiscible solvent for gallic acid and an alkali, said water-immiscible solvent having a boiling point not substantially less than 100° C., extracting the resulting hydrolysis liquor with more of said solvent, removing said solvent from the resulting extract by steam distillation, and crystallizing gallic acid from the residual extract.

13. A method of preparing gallic acid comprising hydrolyzing an aqueous suspension of ground Chinese nut galls in the presence of a water-immiscible solvent for gallic acid and sodium hydroxide, said water-immiscible solvent having a boiling point not substantially less than 100° C., extracting the resulting hydrolysis liquor with more of said solvent, removing said solvent from the resulting extract by steam distillation, and crystallizing gallic acid from the residual extract.

14. A method of preparing gallic acid comprising hydrolyzing an aqueous suspension of ground sumac leaves in the presence of an alkali and a water-immiscible solvent for gallic acid, said water-immiscible solvent having a boiling point not substantially less than 100° C., extracting the resulting hydrolysis liquor with more of said solvent, removing said solvent from the resulting extract by steam distillation, and crystallizing gallic acid from the residual extract.

15. A method of preparing gallic acid comprising hydrolyzing an aqueous suspension of ground sumac leaves in the presence of sodium hydroxide and a water-immiscible solvent for gallic acid, said water-immiscible solvent having a boiling point not substantially less than 100° C., extracting the resulting hydrolysis liquor with more of said solvent, removing said solvent from the resulting extract by steam distillation, and crystallizing gallic acid from the residual extract.

16. A method of preparing gallic acid comprising chemically hydrolyzing a tannin-containing material in the presence of water, extracting the hydrolyzed tannin-containing material with methyl isobutyl ketone, and recovering gallic acid from the resulting extract.

17. A method of preparing gallic acid comprising chemically hydrolyzing a tannin-containing material in the presence of water, extracting the hydrolyzed tannin-containing material with methyl isobutyl carbinol, and recovering gallic acid from the resulting extract.

18. A method of preparing gallic acid comprising chemically hydrolyzing a tannin-containing material in the presence of water, extracting the hydrolyzed tannin-containing material with isoamyl alcohol, and recovering gallic acid from the resulting extract.

19. A method of preparing gallic acid comprising chemically hydrolyzing a tannin-containing material in the presence of water, extracting the hydrolyzed tannin-containing material with an amyl alcohol, and recovering gallic acid from the resulting extract.

20. A method of preparing gallic acid comprising chemically hydrolyzing a tannin-containing material in the presence of water, extracting the hydrolyzed tannin-containing material with cyclohexanone, and recovering gallic acid from the resulting extract.

References Cited in the file of this patent

UNITED STATES PATENTS

| 1,100,730 | Hamel | June 23, 1914 |

FOREIGN PATENTS

| 11,649 | Austria | Apr. 25, 1903 |
| 139,419 | Great Britain | Mar. 4, 1920 |
| 551,828 | France | Jan. 15, 1923 |

OTHER REFERENCES

Beilstein (Handbuch, 4th ed. vol. 10, pgs. 470–472 (1927.)

Richter: "Chemistry of Carbon Compounds" 3rd English ed. vol. II, pg. 379 and vol. III page 370.